US012725201B2

(12) United States Patent
Friedman et al.

(10) Patent No.: US 12,725,201 B2
(45) **Date of Patent: *Sep. 1, 2026**

(54) PROVIDING INFORMATION OF ASSETS FOR TRANSACTION TO A USER BASED ON THE USER PROFILE

(71) Applicant: Auction.com, LLC, Irvine, CA (US)

(72) Inventors: Robert Friedman, Irvine, CA (US); Sarina Kinder, Rancho Santa Margarita, CA (US); Eric Johnson, Irvine, CA (US); Michael Jansta, Irvine, CA (US)

(73) Assignee: Auction.com, LLC, Irvine, CA (US)

( * ) Notice: Subject to any disclaimer, the term of this patent is extended or adjusted under 35 U.S.C. 154(b) by 38 days.

This patent is subject to a terminal disclaimer.

(21) Appl. No.: 19/029,782

(22) Filed: Jan. 17, 2025

(65) Prior Publication Data

US 2025/0245735 A1 Jul. 31, 2025

Related U.S. Application Data

(63) Continuation of application No. 18/629,873, filed on Apr. 8, 2024, now abandoned, which is a continuation of application No. 18/136,311, filed on Apr. 18, 2023, now Pat. No. 11,954,729, which is a continuation of application No. 16/137,909, filed on Sep. 21, 2018, (Continued)

(51) Int. Cl.
*G06Q 30/00* (2023.01)
*G06Q 30/08* (2012.01)

(52) U.S. Cl.
CPC .................................... *G06Q 30/08* (2013.01)

(58) Field of Classification Search
CPC ...................................................... G06Q 30/08
See application file for complete search history.

(56) References Cited

U.S. PATENT DOCUMENTS 7,548,884 B1 * 6/2009 Thomas ............. G06Q 30/0623 705/38
7,707,153 B1 * 4/2010 Petito ..................... G06Q 10/10 707/999.101

(Continued)

OTHER PUBLICATIONS

Mizuta, Hideyuki, and Ken Steiglitz. "Agent-based simulation of dynamic online auctions." 2000 Winter Simulation Conference Proceedings (Cat. No. 00CH37165). vol. 2. IEEE, 2000.*

*Primary Examiner* — Kathleen Palavecino
(74) *Attorney, Agent, or Firm* — Mahamedi IP Law LLP

(57) ABSTRACT

A method for providing a dynamically-updated electronic report of assets available for transaction to a user is provided. The electronic report is provided to a computing device operated by the user. The electronic report includes one or more entries that each corresponds to an asset for sale. Each entry can include a link for the corresponding asset. In response to receiving user selection of a link on the report, one or more characteristics of the asset corresponding to the selected link are determined. One or more additional assets are determined based on the one or more characteristics. The electronic report is dynamically updated to include one or more entries corresponding to the one or more additional assets. A user profile of the user can also be updated in response to the user's selection.

20 Claims, 7 Drawing Sheets

Related U.S. Application Data now Pat. No. 11,663,651, which is a continuation of application No. 14/214,440, filed on Mar. 14, 2014, now Pat. No. 10,109,007.

(60) Provisional application No. 61/800,747, filed on Mar. 15, 2013.

(56) References Cited

U.S. PATENT DOCUMENTS

2001/0029478 A1* 10/2001 Laster .................... G06Q 40/04 705/37
2002/0065763 A1* 5/2002 Taylor .................... G06Q 40/04 705/26.1
2002/0123959 A1* 9/2002 Mozley .................. G06Q 50/16 705/37
2003/0014349 A1* 1/2003 Guler ..................... G06Q 30/08 705/37
2003/0105682 A1* 6/2003 Dicker ............... G06Q 30/0253 705/26.8
2004/0128224 A1* 7/2004 Dabney .................. G06Q 40/00 705/37
2005/0197950 A1* 9/2005 Moya ..................... G06Q 30/08 705/37
2005/0278243 A1* 12/2005 Ghani .................... G06Q 30/08 705/37
2005/0288957 A1* 12/2005 Eraker ................... G06Q 30/00 345/630
2008/0046343 A1* 2/2008 Maguire ............ G06Q 30/0633 705/26.62
2008/0147566 A1* 6/2008 Malik .................... G06Q 30/08 705/36 R
2009/0030768 A1* 1/2009 Ginter .................... G06Q 20/04 713/176
2011/0004560 A1* 1/2011 Knake .................... G06Q 50/16 705/313
2012/0136776 A1* 5/2012 Haberaecker .......... G06Q 40/12 705/38
2012/0246024 A1* 9/2012 Thomas ................. G06Q 30/06 705/27.1
2013/0159142 A1* 6/2013 Moreno ............ G06Q 30/0601 705/26.63
2013/0325623 A1* 12/2013 Balduf ................... G06Q 30/02 705/26.1

* cited by examiner

PROVIDING INFORMATION OF ASSETS FOR TRANSACTION TO A USER BASED ON THE USER PROFILE

RELATED APPLICATIONS

This application is a continuation of U.S. patent application Ser. No. 18/629,873, filed Apr. 8, 2024; which is a continuation of U.S. patent application Ser. No. 18/136,311, filed Apr. 18, 2023, now issued as U.S. Pat. No. 11,954,729; which is a continuation of U.S. patent application Ser. No. 16/137,909, filed Sep. 21, 2018, now issued as U.S. Pat. No. 11,663,65s1; which is a continuation of U.S. patent application Ser. No. 14/214,440, filed Mar. 14, 2014, now issued as U.S. Pat. No. 10,109,007; which claims benefit of priority to Provisional U.S. Patent Application No. 61/800,747, filed Mar. 15, 2013; the aforementioned applications are hereby incorporated by reference in their respective entirety for all purposes.

TECHNICAL FIELD

Examples described herein pertain generally to a system and method for providing updated information about assets for a live auction.

BACKGROUND

A variety of auction forums exist that enable users to transact for various kinds of items, such as collectibles, electronics, and other goods or services.

DETAILED DESCRIPTION

Figure 1:
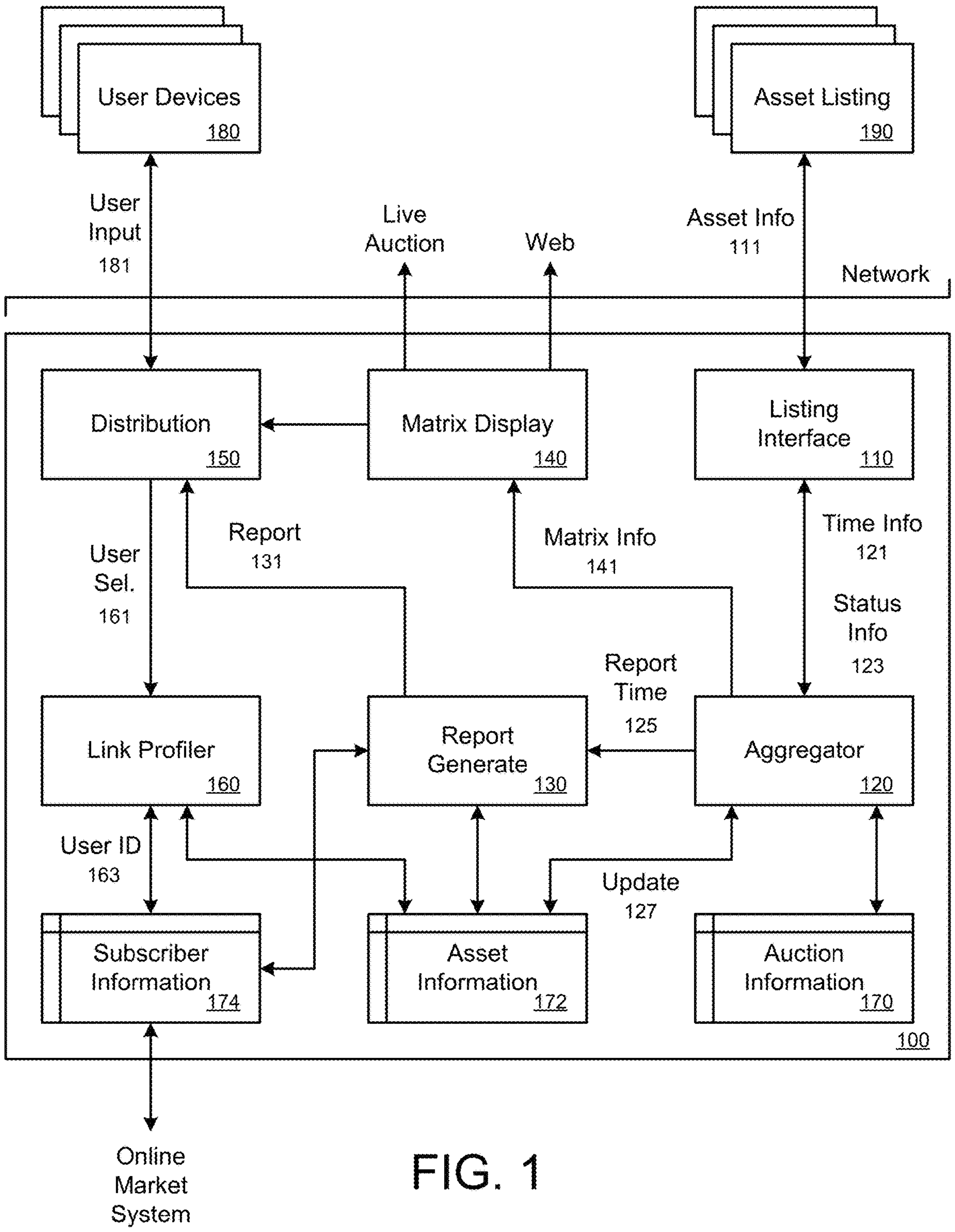
FIG. 1 illustrates an example system for providing information about a plurality of assets for a live auction.

Examples described herein provide a system and computer-implemented method for providing a variety of information about assets for an auction to interested users or participants. Reports can be generated and communicated to users before the auction is held in order to notify users of the statuses of the assets up to the time of the auction. In addition, other presentations can be provided to assist the users during the duration of an auction.

According to examples, a system, such as an auction management system, can communicate with one or more asset listing sources to generate a list that identifies a plurality of assets and a status of each asset in advance of a scheduled auction. The scheduled auction can be a live auction having a start time on a start date. The system can periodically communicate with one or more asset listing sources, at first time intervals, to determine a change in the status of one or more assets. Based on the change in one or more statuses, the list that identifies the plurality of assets can be updated accordingly. A report can be communicated to one or more users based on the updated list.

Depending on implementation, the system can periodically communicate with the asset listing source(s), at first time intervals, until a particular date and/or time (e.g., one day before the start date of the auction, or on the start date of the auction). On that particular date and/or time, the system can communicate with the asset listing source(s), at second time intervals. The second time intervals can be smaller than the first time intervals so that as the auction start time and date approaches, users can receive more up to date information about the assets.

In other examples, a system can identify a plurality of assets that is made to be available during an auction. Each of the plurality of assets can include an auction state. During the auction, a matrix interface can be displayed. For example, a display device that is provided at the location of a live auction can display the matrix interface. The matrix interface can include a plurality of entries, where each entry identifies a corresponding asset and the auction state of that asset. Also during the auction, the auction state of one or more assets can be dynamically updated. The updated auction state(s) can be shown in the matrix interface so that a user can quickly understand the auction states of the assets.

In one example, each of the plurality of assets can be associated with an asset identifier, and each asset identifier can be associated with a reference number. The matrix interface can be displayed by providing, for each of the entries, the reference number of the corresponding asset. In addition, each entry can have a color that is associated with the auction state of the asset. In this manner, a user that is viewing the matrix interface can look for the entry with the reference number of the asset that the user is interested in, and determine whether the asset is available for bidding by looking at the color of the entry.

Still further, in some examples, a system can provide a report to a user or subscriber that includes information about assets that are to be available during an auction. The report can include a plurality of entries that each corresponds to an asset. Each entry can also include a link for the corresponding asset. When the user selects the linked, additional information for that asset can be provided to and viewed by the user. In response to receiving user selection of one or more links on the report, one or more assets corresponding to the one or more selected links are determined, and a profile of the user can be updated with information associated with the determined one or more assets. The system can provide additional listings about one or more other assets available for transaction to the user based on the profile of the user.

As used herein, an "asset" can refer to a tangible item or a product. Examples of an asset can include any item for sale, a vehicle, an antique, real estate property, etc. Types of real estate property can include a house, a townhouse, a condo, an apartment, a business property, land, etc. Also as used herein, a "user" can refer to a bidder (or potential bidder), or buyer of an asset at an auction.

One or more examples described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more examples described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some examples described herein can generally require the use of computing devices, including processing and memory resources. For example, one or more examples described herein may be implemented, in whole or in part, on computing devices such as servers, desktop computers, cellular or smartphones, personal digital assistants (e.g., PDAs), laptop computers, printers, digital picture frames, network equipment (e.g., routers) and tablet devices. Memory, processing, and network resources may all be used in connection with the establishment, use, or performance of any example described herein (including with the performance of any method or with the implementation of any system).

Furthermore, one or more examples described herein may be implemented through the use of instructions that are executable by one or more processors. These instructions may be carried on a computer-readable medium. Machines shown or described with figures below provide examples of processing resources and computer-readable mediums on which instructions for implementing examples of the invention can be carried and/or executed. In particular, the numerous machines shown with examples of the invention include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs, or a computer usable carrier medium capable of carrying such a program.

System Description

FIG. 1 illustrates an example system for providing information about a plurality of assets for a live auction. A system 100 such as described by an example of FIG. 1 can be implemented in a variety of computing environments. For example, system 100 can be implemented as part of an online market system or environment, such as an online auction, or can be implemented as a network service that augments or facilitates an online market place. Accordingly, system 100 can be implemented as a network service, through a combination of servers and/or other network enabled computing devices. In variations, system 100 can be implemented on other computing platforms, including stand-alone systems. Thus, in some variations, system 100 can operate on a product or service that is maintained on a single computing device or storage device.

Depending on implementation, the components of system 100 can combine to provide status information of assets that are to be available during an auction. In particular, in some examples, one or more assets may be removed or postponed from being auctioned. System 100 can communicate with asset listing sources to maintain updated status information of the asset and provide the updated status information to users. According to an example, system 100 can include a listing interface 110, an aggregator 120, a report generate 130, a matrix display 140, and a distribution 150. System 100 can also include one or more data stores, such as an auction information data store 170, an asset information data store 172, and a subscriber information data store 174. In some implementations, data can be shared across the data stores 170, 172, 174, or a single data store can be used to store information found in the data stores 170, 172, 174.

System 100 can include a listing interface 110 to communicate with one or more asset listing sources 190 over one or more networks. The listing interface 110 can receive or retrieve information from the asset listing sources 190. In one example, the listing interface 110 can periodically poll, pull data, and/or send requests to receive information from one or more asset listing sources 190. An asset listing 190 can be a record of assets that are available for an auction. In some cases, an asset listing can be maintained by a trustee, such as an agent or a representative hired by a bank or mortgage holder of an asset. Depending on examples, such an asset can be a distressed asset or an asset having a debt (e.g., on a loan) that is associated with that asset and that is under a foreclosure order.

Depending on government regulations, when a bank or mortgage holder initiates a foreclosure process on the asset, the trustee can (or may be obligated to) publish information about the asset. The trustee can maintain an asset listing that includes a plurality of assets and particular information about the assets. During the foreclosure process, the state or status of the asset can change depending on a various circumstances. The trustee can update the asset listing with newly changed information about one or more assets. For example, before a public sale or auction can be held for the asset, the property owner can stop the foreclosure by reinstating or paying off the loan. The trustee may also find out information during due diligence and/or during the process to clear the asset for sale. As such, one or more of the assets identified in the asset listing sources can be in flux or unstable, e.g., at the time of auction, the asset in flux may not necessarily be available for sale or auction. For example, at a scheduled auction, one hundred assets can be listed that is made to be available for that auction. As the scheduled auction date and time nears, some of the assets may not be available for auction, and by the auction date, only seventy assets may be available.

System 100 can use the listing interface 110 to receive or retrieve information 110 about assets that are made to be available during a scheduled auction (e.g., distressed assets). Although distressed assets can include any type of item, product, vehicle, real property, etc., having a loan associated with it, for illustrative purposes, examples are provided with respect to real property. Information 111 about the assets, including status information of the assets 123, can be provided to the aggregator 120. According to examples, the status of an asset represents whether the asset will be available for the scheduled auction, and can correspond to at least one of (i) cleared for auction, (ii) pending, (iii) postponed, (iv) canceled, and/or (v) sale completed. The aggregator 120 can generate a list of a plurality of assets and the status of each asset in advance of a scheduled auction using the asset information 111 provided by the one or more asset listings 190. The list of the plurality of assets can be stored in, for example, the asset information data store 172.

In addition, the aggregator 120 can receive information about one or more scheduled auctions from the one or more asset listing sources 190 (e.g., received as part of the asset information 111) or from other sources. Information about the scheduled auction(s) can be stored in the auction information data store 170. For example, information about a scheduled auction can include a date, a starting time, an end time, what assets or types of assets are to be sold/auctioned, an address, and/or the party conducting the auction. The auction information in the data store 170 can be associated with the asset list in data store 172, so that the aggregator 120 can identify which asset listing sources 190 to update information about particular assets for a particular scheduled auction.

In some examples, the aggregator 120 can also control when system 100 communicates with one or more asset listings sources 190. For example, based on information found in the list of assets and/or information about the scheduled auction(s), the aggregator 120 can determine how often to communicate with the one or more asset listings sources 190. For a given scheduled auction, the aggregator 120 can provide time information 121 to control the intervals of time in which the listing interface 110 can periodically communicate with the asset listing source(s) 190. For example, system 100 can periodically communicate with the asset listing source(s) 190 at first time intervals (e.g., every twenty four hours, or every two days) if a scheduled auction is multiple weeks or months away from the current date and time. As the scheduled auction start time and date approaches, the aggregator 120 can adjust the time information 121 so that system 100 can periodically communicate with the asset listing source(s) 190 more frequently. For example, if the schedule auction is within five days from the current date and time, the listing interface 110 can communicate with the asset listing source(s) 190 at second time intervals (e.g., every twelve hours). Three or more different time intervals can be used so that as a scheduled auction start time and date approaches, the more frequently system 100 periodically communicates with one or more asset listing sources 190.

In another example, the listing interface 110 can periodically communicate with the asset listing source(s), at first time intervals (e.g., every twenty four hours), until the start date of a scheduled auction. On the start date of the scheduled auction, the listing interface 110 can periodically communicate with the asset listing source(s), at second time intervals (e.g., every fifteen minutes), until the start time of the auction or until another time during the duration of the auction. By communicating with the asset listing sources 190, the aggregator 120 can update information in the asset list stored in the asset information data store 172.

Depending on implementation, the asset list that is stored in the asset information data store 172 can include a plurality of entries, where each entry corresponds to an asset that is made to be available during a scheduled auction. The asset list can include a variety of information about the assets. For example, each entry (or some of the entries) can include: (i) an identifier or search code, (ii) trustee identifier or foreclosure listing number (FCL), (iii) an assessor's parcel number (APN), (iv) address of the asset (e.g., number, street, city, county, state, zip code), (v) a status, (vi) auction information (e.g., date, time, location), (vii) asset information (e.g., number of bedrooms, number of bathrooms, lot size, square footage, year built, garage size), and/or (viii) pricing information (e.g., total estimated debt, opening bid for the auction, minimum amount required). When the aggregator 120 receives asset information 111, including status information 123 of assets, the aggregator 120 can access the asset information data store 172 to determine whether there is a change in information (e.g., change in any of the information, or status) of one or more assets in the asset list. If a change exists, the aggregator 120 can update 127 the entry in the asset list. In this manner, as a scheduled auction date and time approaches, the aggregator 120 can perform updates, if necessary, more frequently by periodically communicating with the asset listing source(s).

The aggregator 120 can also communicate with the report generate 130 in order to cause or schedule the report generate 130 to generate one or more reports using information stored in the asset information data store 172. In some examples, the report generate 130 can, in connection with the aggregator 120, generate one or more reports based on a set schedule or based on triggering events. The aggregator 120 can provide report timing information 125, in one example, that causes the report generate 130 to retrieve the appropriate information from the asset information data store 172 and generate one or more reports using the information.

A report 131 can correspond to a document, a presentation, a spreadsheet, etc., that includes information about one or more assets made available for auction (such as one or more information described in the asset list). The report 131 can include a portion of the assets identified in the asset list stored in the asset information database 172 and their respective information. For example, a report 131 can be specific to assets that are located in a given geographic region, e.g., a particular city (or cities), a county (or counties), a state, etc., and/or specific to assets that are registered or made to be available for a particular scheduled auction. The report 131 can also include information about the statutes of the assets provided on the report (e.g., whether the asset has been cleared for sale, is pending clearance, is postponed, is canceled, etc.). A user or subscriber who receives or views the report 131, can have a better understanding, in advance of the scheduled auction, of the states of the assets, and can continue to receive updated reports 131 until the scheduled auction time.

Depending on examples, the report generate 130 can generate a report 131 that is to be provided to users or subscribers on a set schedule (e.g., every day, every two days, etc.) that can be configured by an administrator, for example, of system 100. The time intervals for the frequency of generating and providing the report 131 can also change (e.g., automatically) depending on the auction start date and time (e.g., provide reports more frequently, as the auction date approaches closer). In another example, the report generate 130 can generate a report 131 based on received requests from users or subscribers. Still further, in other examples, the aggregator 120 can also trigger (via report timing information 125) the report generate 130 to generate a report (i) in response to the aggregator 120 communicating with the asset listing source(s) (e.g., periodically), and/or (ii) when the aggregator 120 determines that one or more entries in the asset list has been updated or a predetermined number of entries has been updated.

The report generate 130 can generate one or more reports by selecting particular assets for that report. Each report 131 can also include a report identifier. For example, for a report 131 that is specific to assets that are located in a given geographic region, such as a particular county, the report generate 130 can select one or more assets from the asset list stored in the asset information data store 172 that have a location in that given geographic region. The selected assets can be included in the report 131. Similarly, for a report 131 that is specific to a particular scheduled auction, the report generate 130 can select one or more assets from the asset list that have been identified as an asset to be auctioned at that scheduled auction. In some examples, in response to a particular report request, the report generate 130 can generate a report 131 that is specific to a particular user and includes assets particularly requested by that user via the report request. One or more reports 131 can be communicated to users or subscribers (e.g., so that the one or more reports 131 can be accessed, interacted with, and/or viewable on one or more computing devices 180 associated with users or subscribers).

In one example, the report generate 130 can provide the generated one or more reports 131 to the distribution 150. According to some examples, the distribution 150 can provide the reports 131 to the appropriate users in response to receiving the report 131 from the report generate 130 (e.g., receiving the report can act as a trigger to automatically provide the report to one or more users). The distribution 150 can provide the one or more reports 131 to appropriate users or subscribers using a variety of different methods.

For example, each user can operate a user computing device 180, such as a personal computer, laptop, tablet device, smart phone, etc., to interact with an interface, such as an interface implemented as part of a web page that can be displayed on display devices of the user devices 180. A user can also operate a computing device 180 to receive communications (e-mails, text message, etc.) via distribution 150. For example, the distribution 150 can cause the report(s) 131 to be displayed with a web page, or provide the report(s) 131 as part of or included in an e-mail message. The distribution 150 can also format the report(s) accordingly, based on the manner in which the report is provided. In other variations, the distribution 150 can provide the report(s) 131 as part of an application page or presentation that can be displayed on user devices 180. Still further, in another example, distribution 150 can communicate with one or more printing services to cause physical paper reports to be printed and mailed to users.

The distribution 150 can determine which users are to receive which reports 131 and/or when to receive the reports 131. Depending on implementation, the distribution 150 can receive subscriber information (e.g., user ID, location, telephone number, email address, address, when to provide the report the user, etc.) when the report 131 is provided by the report generate 130. In other examples, the distribution 150 can also communicate with the subscriber information data store 174, which stores profiles of users or subscribers to system 100 and/or the online market system. For a particular report 131, the distribution 150 can use information stored in the subscriber information data store 174 (e.g., user ID, location, telephone number, email address, address, when to provide the report the user, etc.) to select one or more users who are to receive that report 131 (e.g., based on the location of the user, if it is within a predetermined distance of the auction location and/or a given geographic region of assets), determine how the report is to be provided to the selected one or more users, and/or determine when the report is to be provided.

In this manner, a user who is interested in assets for auction in a particular geographic region, can subscribe to a report for that particular geographic region, and not receive reports for other regions. Because some auctions, such as an auction for foreclosure assets, require a bidder or user to be present at the auction (e.g., a live auction), it is beneficial to provide reports 131 that are specific to assets that a user can physically visit and/or are specific to a scheduled auction that the user can participate in.

Matrix Interface

In some examples, system 100 can also include a matrix display 140 that can, in connection with the aggregator 120, display a matrix interface (or other interfaces of different shape, e.g., circular, triangular, etc.) during the duration of an auction (e.g., a live auction). For some types of auctions, such as an auction for foreclosure assets, assets that are made to be available during the auction can still be in flux even while the auction is on-going. For example, according to foreclosure rules or regulations, a transaction for a distressed asset may not be completed until it is "cried out" at the auction. Before such event, the property owner of an asset can take steps so that the asset is not cleared for sale at the auction. System 100 can provide, during the auction, a matrix interface that includes real-time or close to real-time information about statutes or auction states of the asset. In this manner, changes to the auction state of an asset can be reflected in the matrix interface that is displayed at the live auction, for example, or displayed on user devices 180.

In one example, for a particular scheduled auction, the matrix display 140 can communicate with the aggregator 120 to identify a plurality of assets that is made to be available during the scheduled auction. Each of the assets can include an auction state, such as, (i) cleared for auction, (ii) pending, (iii) auctioned, (iv) postponed, or (v) canceled. The aggregator 120 can access the asset information data store 172 to provide relevant information 141 for the matrix interface. In some examples, the asset list stored in the asset information data store 172 can include entries that each have an asset identifier for that asset. The aggregator 120 can associate each of the asset identifiers for the assets of the scheduled auction with a reference number (e.g., a reference number from 1 to 200, or to how many total assets are available for that scheduled auction). The aggregator 120 can maintain a mapping or reference table of reference numbers and associated asset identifiers for a scheduled auction. The aggregator 120 can provide, to the matrix display, matrix information 141, which can include (i) the reference numbers for the identified assets for that scheduled auction, and (ii) the auction states for each of the identified assets. This information can be provided to the matrix display 140 just before the scheduled auction begins and/or during the course of the auction.

Using the matrix information 141, the matrix display 140 can generate and display, before the auction begins and/or during the course of the auction, a matrix interface that has a plurality of cells or entries. Each of the cells or entries can identify a corresponding asset and the auction state of that asset. During the course of the auction, the matrix information 141 can dynamically update the auction state of one or more assets identified by the entries in the matrix interface. The auction state can be updated based on detected changes to the auction states of an asset. For example, during the course of the auction, system 100 can continue to periodically communicate with the asset listing source(s) 190 to determine information about assets that are made to be available during that auction (e.g., communicate with the asset listing source(s) every minute or every two minutes). When the auction state changes for a respective asset, the aggregator 120 (such as described above) can update the asset list stored in the asset information data store 172, and provide updated auction state information for that asset to the matrix display 140 (e.g., using the reference number of the asset). The matrix display 140 can dynamically update the respective entries of the matrix interface to reflect the most recent auction state for the corresponding assets.

In one example, a display device, such as a television or a project, can be provided at a venue of a live auction. The live auction can be scheduled to take place at a verified venue, such as a courthouse, a ballroom at a hotel, a convention center, etc. The matrix interface can be displayed on the display device so that bidders at the auction can view up-to-date information about assets that are made to be available during that specified auction. According to examples, auction states for particular entries (e.g., each entry corresponding to or identifying a particular asset) can be visually distinguished on the matrix interface using visual cues, such as different colors, textures, shading, etc. The matrix display 140 can maintain a matrix mapping table in which each auction state can correspond to a particular color, shading, or other visual cue (e.g., including graphics, images, icons, etc.). For example, the auction state "cleared for auction" can correspond to the color green, while the auction state "canceled" can correspond to the color red. As such, dynamic updates to an auction state for an asset can result in the color of the matrix interface entry/cell for that asset to be changed.

According to other implementations, the matrix display 140 can also enable the matrix interface to be displayed on the web, e.g., as part of a web page related to the scheduled auction or system 100. In some examples, the matrix display 140 can provide the matrix interface (and updates to the matrix interface) to the distribution 150 so that the matrix interface can be provided to one or more subscribers or users, via their respective computing devices 180. In such cases, the matrix display 140 can format the matrix interface based on the manner in which the matrix interface is to be displayed (or provided to devices for display).

Active Links

System 100 can also include a link profiler 160. As described above, a user can receive one or more reports 131 that is specifically subscribed to by the user, or one or more reports 131 of assets and/or auctions in a nearby geographic location of the user. The one or more reports 131 can include entries that each corresponds to an asset that is to be made available during a scheduled auction. Each entry can also include a link for that corresponding asset, such that when a user views the report 131 and selects a link (e.g., using one or more user devices 180), additional information about that asset can be displayed to the user. The link profiler 160 can receive indication of the user's selection of one or more links, and can monitor or track what types of assets (and/or their characteristics) the user likes or is interested in. In one example, the link profile can operate on the basis that a user is interested in an asset because the user selected a link to view additional details about that asset.

When the user provides a user input 181, such as selecting one or more links of assets from the report 131, the user's selection(s) 161 are provided to the link profiler 160. In one example, the link profiler 160 can determine the identity or a user identifier (ID) of the user who provided the user selection(s) 161 (e.g., from the distribution 150, from information included in the user selection(s) 161, from information about which users received the report 131, by communicating with the report generate 130, etc.). Based on the user selection(s) 161, the link profiler 160 can determine one or more assets that correspond to the one or more selected links. Depending on implementation, the link profiler 160 can determine or identify the one or more assets the user was interested in from the selected link(s) itself (e.g., the link itself can be an active link that includes information about the asset, such as the associated identifier of the asset) and/or by looking up the one or more assets using the selected link(s) in the asset information data store 172.

The link profiler 160 can also determine one or more characteristics of the determined asset(s) using information stored in the asset information data store 172. For example, for real estate property assets, the characteristics can include, but are not limited to, (i) a number of bedrooms, (ii) a number of bathrooms, (iii) size (lot size or square footage), (iv) price (estimated remaining loan amount, minimum bid), (v) location, (vi) type (e.g., single family home, condo, townhouse), or (vii) age. Other characteristics can include style, single floor or multiple floor, backyard, or specifics about the interior of the house (e.g., hardwood floors, French doors, etc.). As another example, for vehicle assets, the characteristics can include types of vehicles, brand, capacity, number of seats, color, year, etc. The link profiler 160 can update the profile corresponding to a user ID 163 of the user or subscriber with information associated with the determined one or more assets (such as with one or more characteristics). In this manner, the user's profile can be updated to include information that can be indicative of assets that the user is interested in.

By maintaining the user's profile in a subscriber information data store 174, system 100 and/or an online market system can access the user's profile in order to tailor or customize future listings (or reports) of assets to that user. For example, system 100 can communicate with, or operate as part of, the online market system, so that when additional assets are available for auction or transaction, one or more assets can be selected based on the user's profile. The selected assets can have one or more similar characteristics that are of interest to the user. In this manner, listings can be provided to the user in the future that includes information about assets available for transaction that the user may have an interest in.

Methodology

Figure 2:
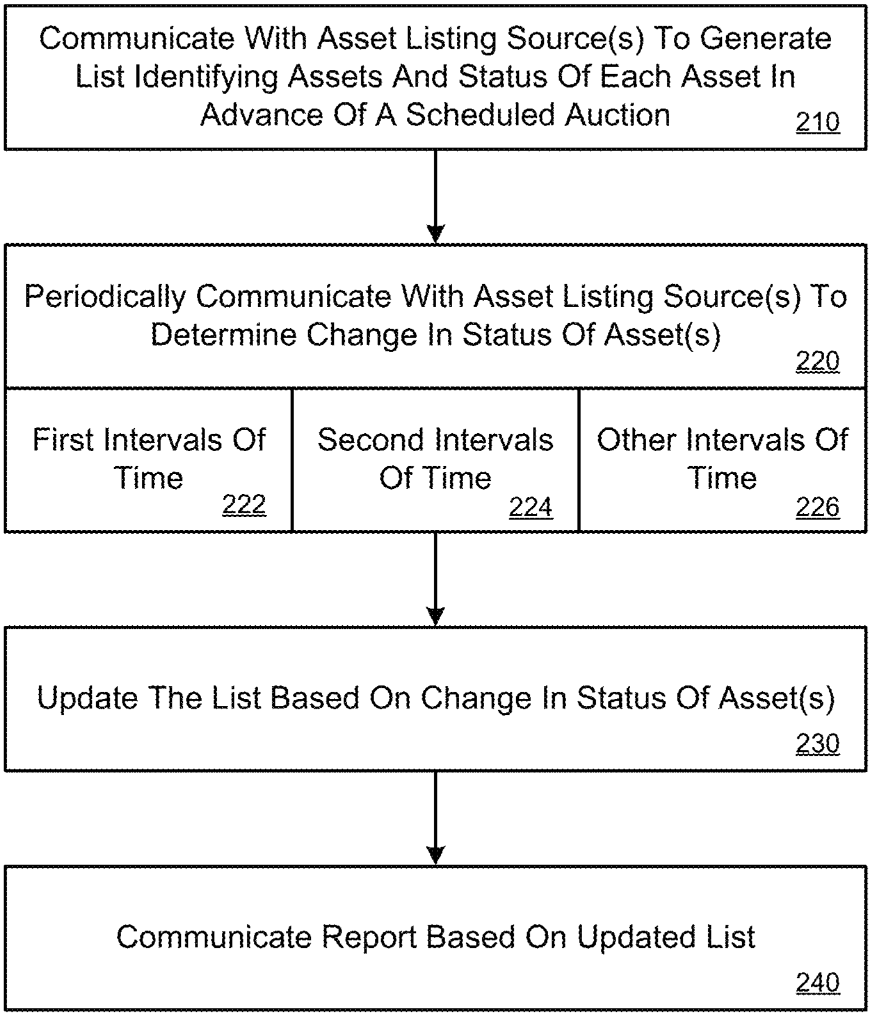
FIG. 2 illustrates an example method for providing information about a plurality of assets for a live auction.

FIG. 2 illustrates an example method for providing information about a plurality of assets for a live auction. A method such as described by an embodiment of FIG. 2 can be implemented using, for example, components described with an embodiment of FIG. 1. Accordingly, references made to elements of FIG. 1 are for purposes of illustrating a suitable element or component for performing a step or sub-step being described.

A system, such as an auction management system, can communicate with one or more asset listing sources to generate a list that identifies a plurality of assets and a status of each asset in advance of a scheduled auction (210). The scheduled auction can be a live auction having a start time on a start date. In some examples, the assets can be distressed assets or be in flux, so that one or more of the assets may not be available for auction at the scheduled auction. The asset list can include entries for each asset and can include a variety of information, such as status information.

The system can periodically communicate with one or more asset listing sources to determine a change in the status of one or more assets (220). The frequency in which the system can periodically communicate with asset listing sources can vary depending on the current time and the scheduled auction date and time. For example, the intervals of time for periodic communication with the asset listing sources can decrease (e.g., from first intervals of time 222 to second intervals of time 224) as the scheduled auction date nears, so that users can be notified more frequently of updated statuses of assets.

In one example, the system can communicate with asset listing sources at first time intervals (e.g., every twenty four hours) until the start date of the scheduled auction, and then communicate with asset listing sources at second time intervals (e.g., every hour) until a set time before the start time of the scheduled auction (e.g., until two hours before). The system can communicate with asset listing sources at third time intervals (e.g., every fifteen minutes) from the set time until the auction completes (e.g., other intervals of time 226).

Based on the change in one or more statuses (or other information) of assets in the asset list, the list can be updated accordingly (230). In some examples, the status of an asset can correspond to at least one of: (i) cleared for auction, (ii) pending, (iii) postponed, or (iv) canceled. A report can be generated using information from the asset list (and/or updated asset list) and can be communicated to one or more users or subscribers (240). Depending on implementation, the report can include information about particular assets in a given geographic area and/or of assets that are made to be available at a specified scheduled auction. As such, different reports can be generated, and different users/subscribers can receive different reports based on the user's preferences, the user's profile, the user's subscriptions, and/or the user's location.

Figure 3:
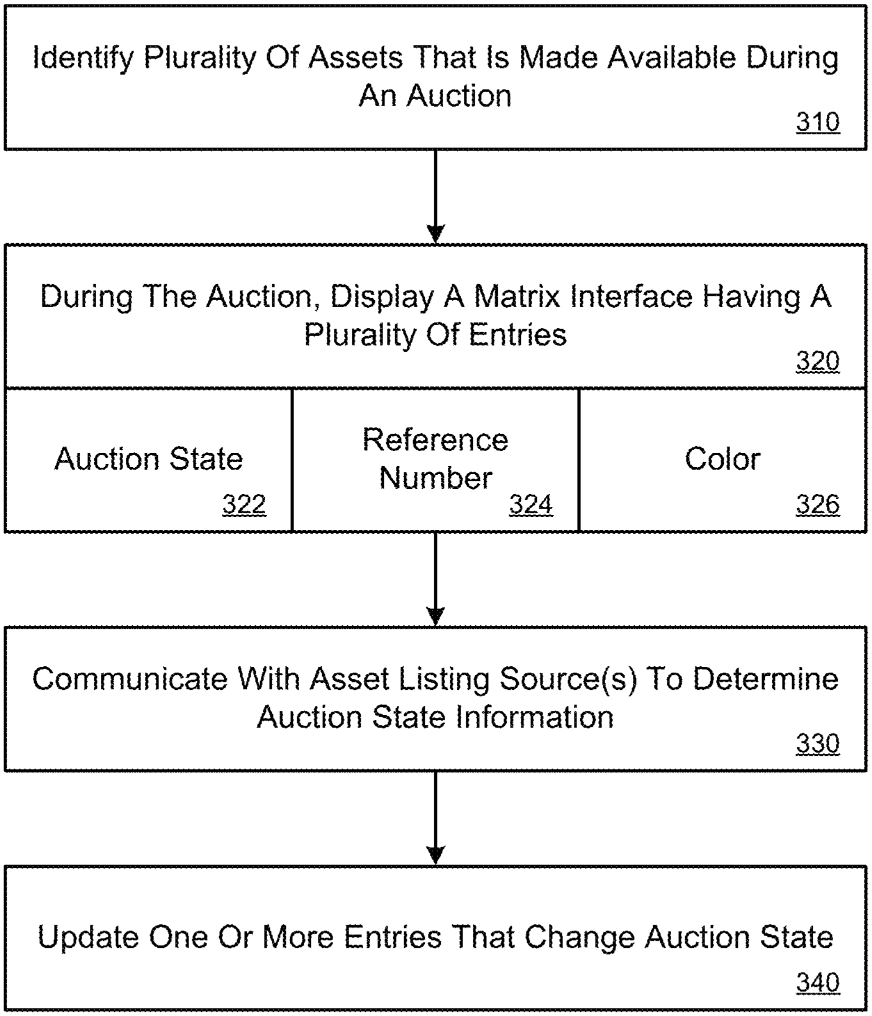
FIG. 3 illustrates another example method providing information about a plurality of assets for a live auction.

FIG. 3 illustrates another example method providing information about a plurality of assets for a live auction. A method such as described by an embodiment of FIG. 3 can be implemented using, for example, components described with an embodiment of FIG. 1. Accordingly, references made to elements of FIG. 1 are for purposes of illustrating a suitable element or component for performing a step or sub-step being described.

In some examples, information about assets for an auction can be displayed during the auction in order to provide real-time or close to real-time updates about auction states of assets. A plurality of assets can be identified that are made to be available during a scheduled auction (310). In some examples, the assets can correspond to a distressed item or real property, and the scheduled auction can be a live auction that is held at an approved venue. Information the assets can include the auction states for the assets as well as a reference number for an identified asset. In one example, an aggregator 120 (or one or more other components of system 100) can maintain a mapping or reference table of reference numbers and associated asset identifiers for each asset that is made to be available during the scheduled auction.

Before the start of the auction (e.g., a few hours before, immediately before) or during the auction, a matrix display 140 can display a matrix interface (or table or checker board) having a plurality of entries or cells (320). Each of the entries can identify a corresponding asset and the auction state of that asset (322). The auction state can correspond to at least one of: (i) cleared for auction, (ii) pending, (iii) auctioned, (iv) postponed, or (v) canceled. In one implementation, the entry can identify the corresponding asset by displaying, with the entry, a reference number that corresponds to the asset or the asset identifier (324). In addition, auction states for entries can be visually distinguished on the matrix interface using visual cues, such as different colors, textures, shading, etc. (326).

During the course of the auction, the auction state of one or more assets can be dynamically updated. In one example, during the auction, the system can continue to communicate with one or more asset listing sources to determine information about the assets that are made to be available during that auction (330). When the determined information indicates a different auction state for a respective asset (e.g., the auction state has changed since a previous communication with the one or more asset listing sources), the aggregator 120 can update the asset list and provide updated auction state information for that asset to the matrix display 140 (340). The matrix display 140 can dynamically update the respective entries of the displayed matrix interface to reflect the most recent auction state for the assets. The updated auction state(s) can be shown in the matrix interface (e.g., using colors or other distinguishing features) so that a user can quickly understand the auction states of the assets.

Figure 4:
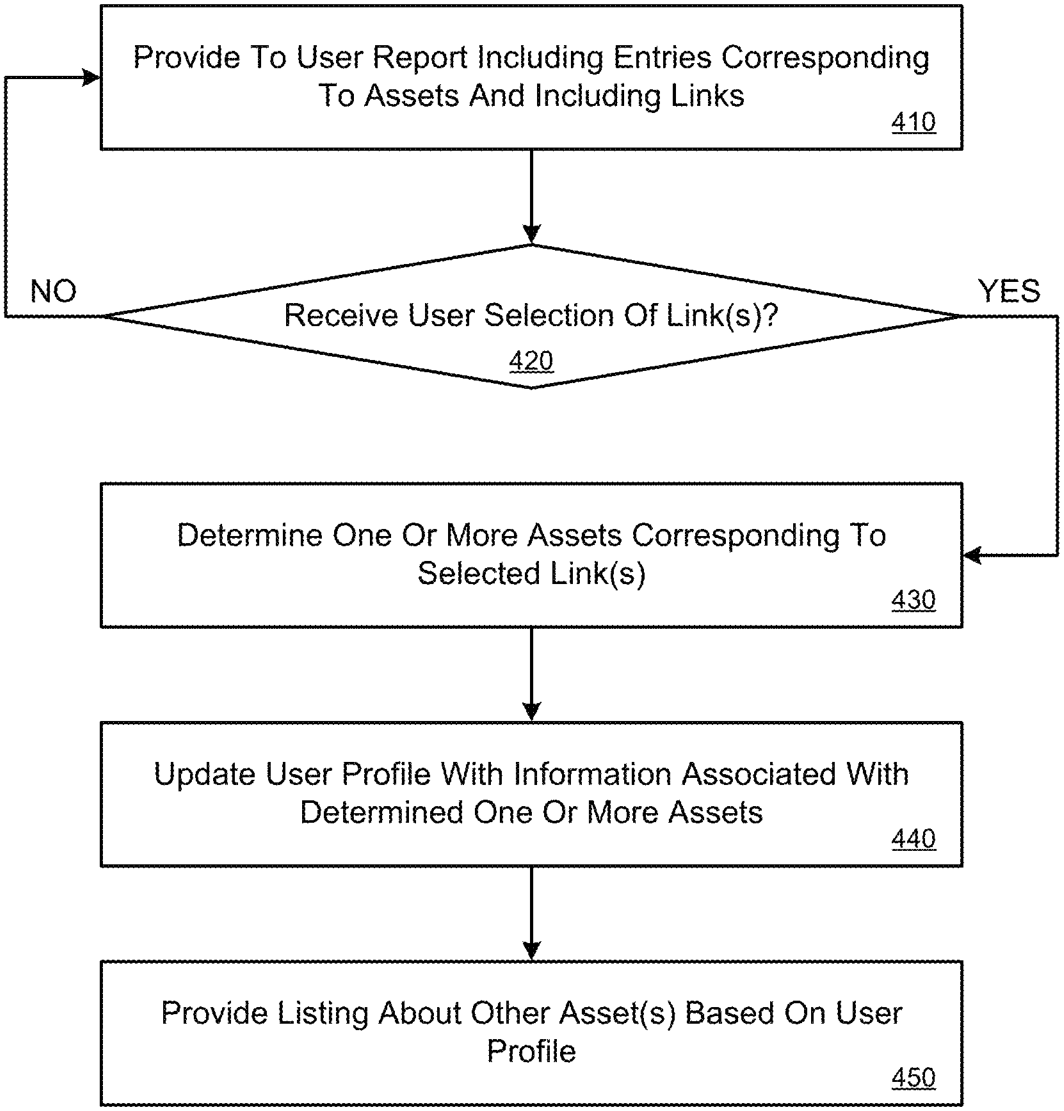
FIG. 4 illustrates an example method for providing information of assets for transaction to a user based on a profile of the user.

FIG. 4 illustrates an example method for providing information of assets for transaction to a user based on a profile of the user. A method such as described by an embodiment of FIG. 4 can be implemented using, for example, components described with an embodiment of FIG. 1. Accordingly, references made to elements of FIG. 1 are for purposes of illustrating a suitable element or component for performing a step or sub-step being described.

As described in FIGS. 1 and 2, for example, system 100 can generate and provide a report that includes information about assets that are made to be available during a scheduled auction. The reports can be provided to users or subscribers, in advance of the auction, and can include a plurality of entries that each corresponds to an asset. Each of the entries can also include a link (e.g., as part of the entry) for the corresponding asset that the user can select to view additional information about that asset. For example, the report can be provided to a user's computing device, e.g., via as part of a web page or an e-mail message to the user, so that the report can be viewed by the user and links may be selected by the user (410).

The system can determine whether the user selected any one or more of the links provided in the report (420). If the user did not select any links, e.g., the system determines that no user selection of links were made by the user operating the user's computing device, the system does not perform any additional tasks with respect to the links. On the other hand, if the user selects one or more links from the report, additional information of assets corresponding to the one or more selected links are provided to the user. A link profiler 160, for example, can also determine the user ID of the user who provided the user selection of one or more links. In addition, in response to receiving user selection of one or more links from the report, the link profiler 160 determines one or more assets corresponding to the one or more selected links (430).

Depending on implementation, the link profiler 160 can determine or identify one or more assets the user was interested in from the one or more selected links. A link itself can be an active link that includes information about the asset, such as the associated identifier of the asset. The link profiler 160 can also look up one or more assets from the asset list using the selected link(s) to determine the assets corresponding to the selections. The link profiler 160 can also determine one or more characteristics of the determined asset(s) using information stored in the asset information data store 172.

The profile of the user can be determined and updated with information associated with the determined one or more assets (440). For example, the user's profile can be maintained in a subscriber information data store 174, so that the system and/or an online market system can access the user's profile in order to tailor or customize future listings of assets to that user. Based on the user's profile, the system can provide additional listings about one or more other assets available for transaction to the user (450).

Examples

Figure 5:
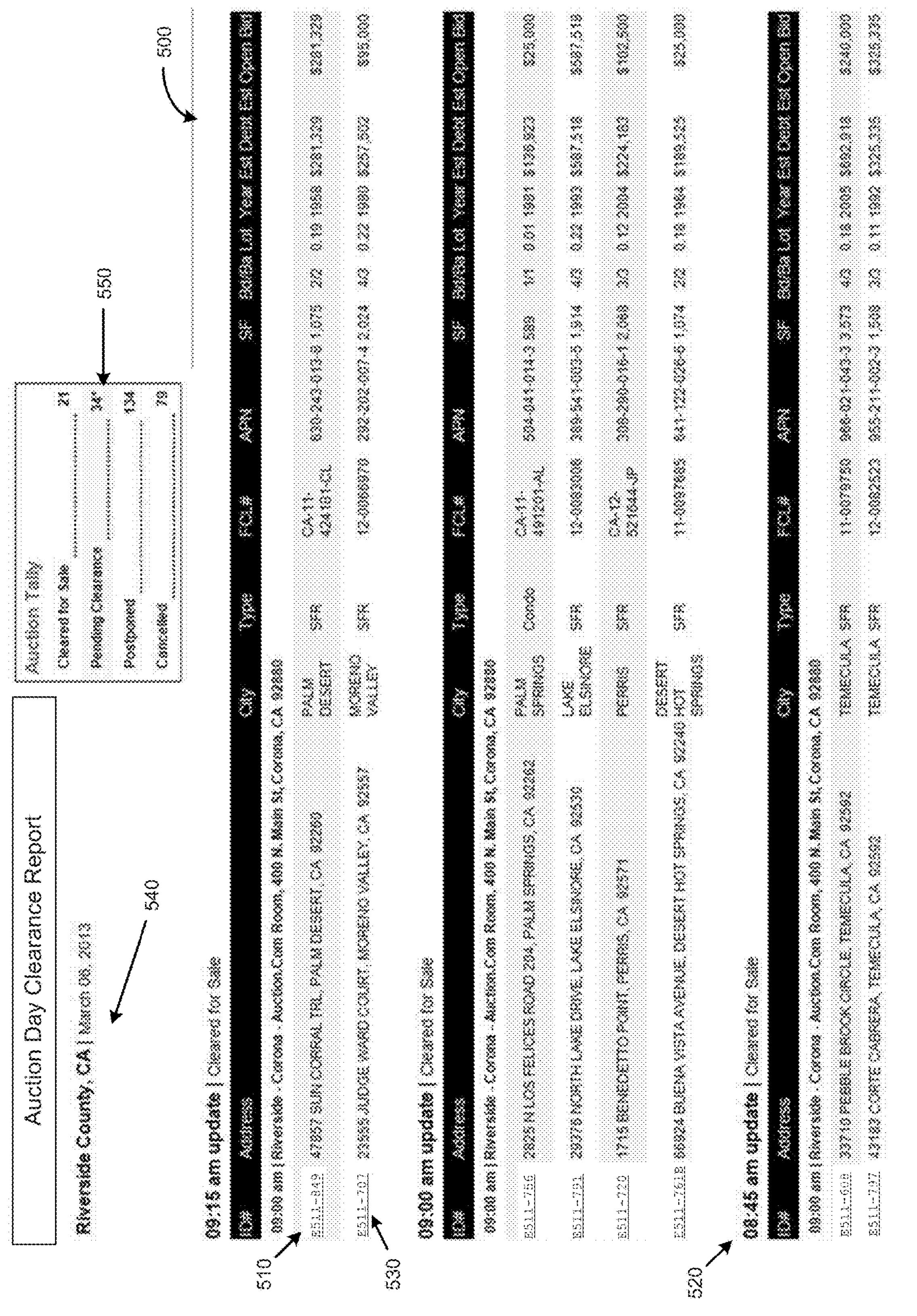
FIG. 5 illustrates an example report that includes information about a plurality of assets and their corresponding statuses.

FIG. 5 illustrates an example report that includes information about a plurality of assets and their corresponding statuses. A report 500 as described in FIG. 5 can be an example of a report as discussed with respect to FIGS. 1 through 4. In one example, the assets described in the report 500 can correspond to real estate property. A report 500 can be provided to users or subscribers in advance of a scheduled auction.

According to an example, the report 500 includes a plurality of entries 510 that each corresponds to an asset. For each asset, the entry 510 can include a plurality of information, such as an ID number, the address, the city, the asset type (e.g., single family residence (SFR), condominium, etc.), FCL, APN, square footage or size, number of bedrooms and bathrooms, lot size, year the asset was built, estimated debt left, the open bid amount, etc. In addition, the report 500 can include other information 540, such as the date the report was generated or provided (e.g., Mar. 6, 2013), what geographic region the report is specified for (e.g., Riverside County, California), and the address for the venue for the scheduled auction. In a geographically specified report, assets that are located in the given geographic region are provided as entries 510 in the report.

The report 500 can be provided days in advance of the scheduled auction date, or can be provided on the day of the scheduled auction date (e.g., as identified by the heading "Auction Day Clearance Report"). The report 500 can provide information about changes to statuses of assets in periodic intervals. As illustrated in FIG. 5, the report can include time stamps 520 in which the statuses of one or more assets changed. In this example, the statuses of one or more assets have changed from a previous status to a status indicating "cleared for sale." The report 500 has been updated (and/or generated) at 8:45 am, at 9:00 am, and at 9:15 am (Note that the report 500 may have also been updated at 8:30 am, at 8:15 am, and so forth, but is not illustrated in FIG. 5 for simplicity purposes).

In some examples, as described with respect to FIGS. 1 through 4, each of the entries 510 provided in the report 500 can include an active link 530. Depending on implementation, different parts of an entry 510 can be linked to be an active link 530. In the report 500, each of the ID numbers of an entry 510 has been designated to be a link 530, so that a user can select the link in order to view additional material about that asset. When the link 530 is selected for the asset in "Moreno Valley," system 100 can update the user's profile with information associated with this asset and one or more characteristics of the asset.

In addition, the report 500 can also include a selectable auction tally table 550 or graphic. The auction tally table 550 can indicate a plurality of statuses for the assets that are made to be available for the scheduled auction corresponding to the report 50. The auction tally table 550 can keep track of the number of assets each having a particular current status (e.g., "cleared for sale," "pending clearance," "postponed," or "canceled"). The user can select each of the statuses in the auction tally table 550 to view entries 510 of assets having that particular selected status.

In this manner, a user who is interested in purchasing assets for an auction can subscribe to a report, such as report 500, in order to view up-to-date information about the assets in advance of the auction.

Figure 6:
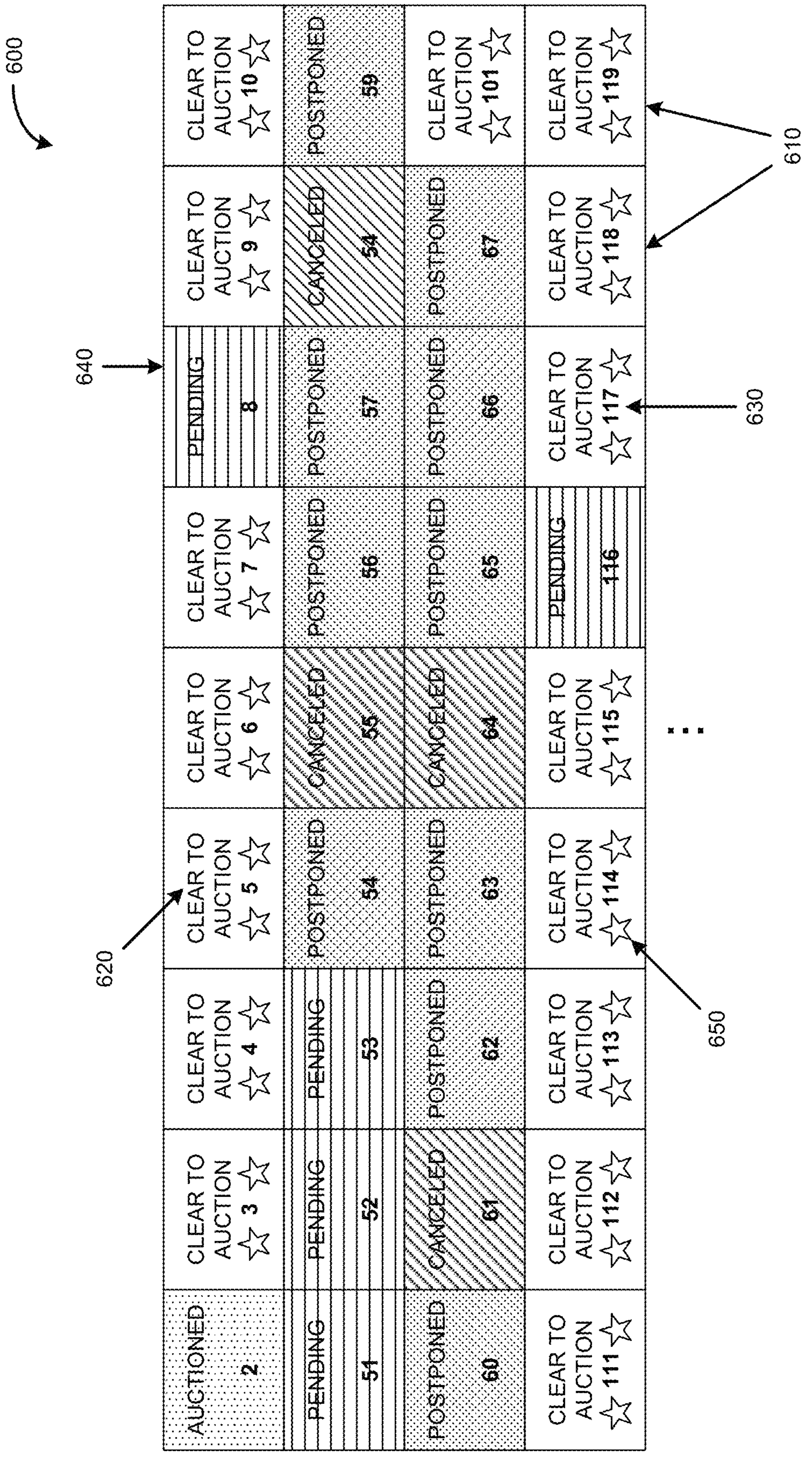
FIG. 6 illustrates an example matrix interface that identifies a plurality of assets and their corresponding auction states.

FIG. 6 illustrates an example matrix interface that identifies a plurality of assets and their corresponding auction states. A matrix interface 600 as described in FIG. 6 can be an example of a matrix interface as discussed with respect to FIGS. 1 through 4.

In one example, the matrix interface 600 can be a matrix, or rectangular checkerboard or table, which includes a plurality of entries 610 or cells. In alternative examples, the matrix interface 600 can have different shapes and different sized cells. The matrix interface 600 can be displayed at a live auction venue, for example, or on one or more user computing devices. The matrix interface 600 can also be displayed on the day of the auction, such as just before the auction begins and during the course of the auction. Each entry 610 can identify a corresponding asset and the auction state of that asset. In addition, the displayed matrix interface 600 can dynamically change the contents of the entry 610 as status updates for the assets are determined by the system.

Depending on implementation, an entry 610 can include an auction state identifier 620 and a reference number 630. The auction state identifier 620 represents the current auction state for the asset represented by that entry 610. In addition, the reference number 630 can correspond to the asset. Bidders can be provided a reference sheet or mapping table of what asset each reference number is associated with. In this manner, a bidder can simply focus on a handful of numbers for assets that the bidder is interest in, and determine from the respective entries 610 the current auction state of the assets.

The entries 610 can also have different colors 640, textures, shading, etc., to represent the auction state of the respective asset. For example, the auction state "clear to auction" can correspond to the color green, which can typically represent "go" or "proceed," while the auction state "pending" can correspond to the color yellow. The auction state "canceled" can correspond to the color red, while the auction state "postponed" can be a neutral color such as gray or brown. As an addition or an alternative, the entries 610 can include a graphic or icon 650 that also represents a particular auction state (e.g., such as "clear to auction"). Another example of a graphic can include a circle with a slash through it to represent the auction state "canceled." As auction states change and are updated, the colors 640 and the auction state identifier 620 for a respective entry 610 can be dynamically updated. In this manner, a bidder that is observing the matrix interface can easily see the change in colors and understand the changes in statuses of assets.

Hardware Diagram

Figure 7:
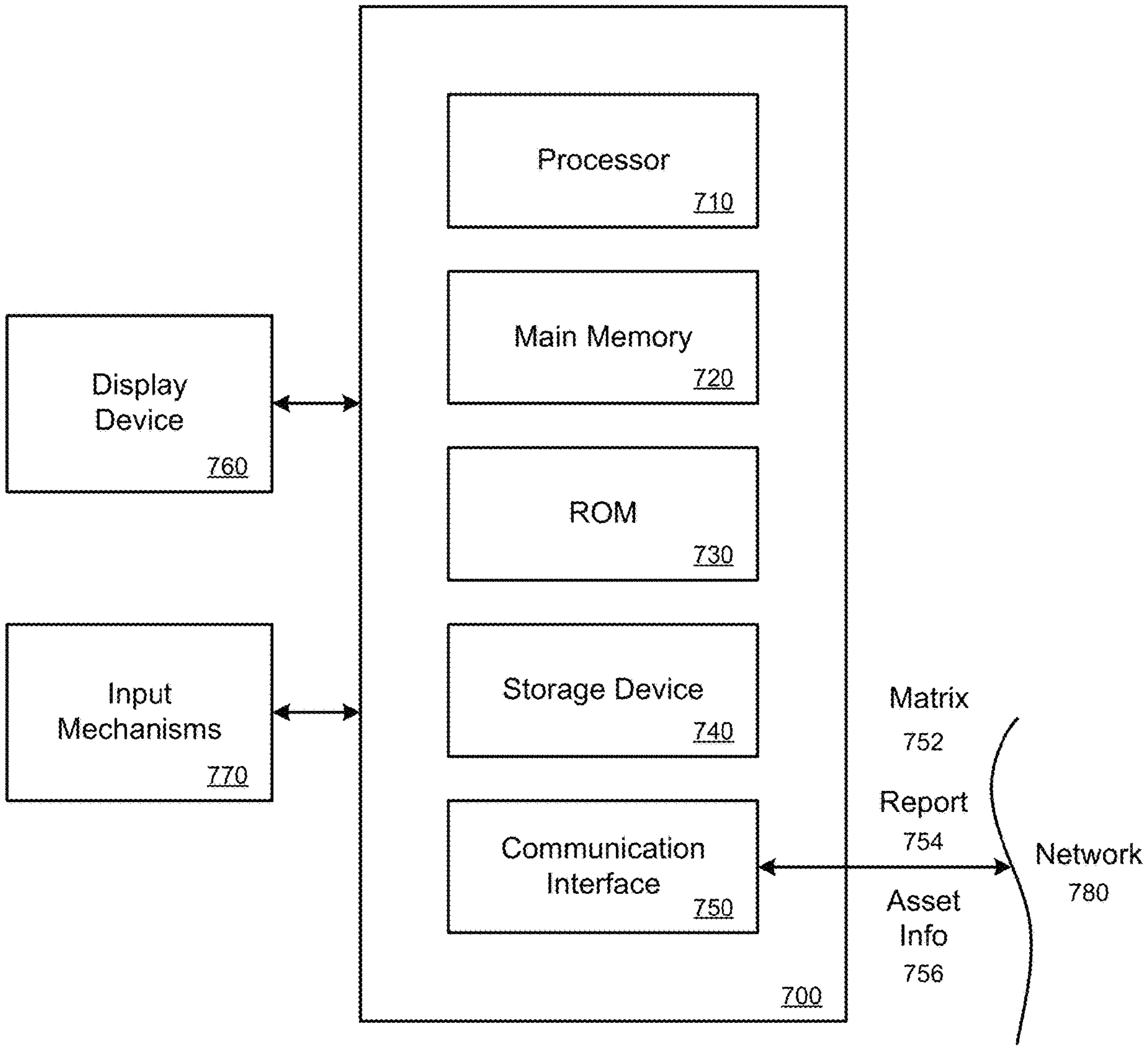
FIG. 7 is a block diagram that illustrates a computer system upon which examples described herein may be implemented.

FIG. 7 is a block diagram that illustrates a computer system upon which examples described herein may be implemented. For example, in the context of FIG. 1, system 100 may be implemented using a computer system such as described by FIG. 7. System 100 may also be implemented using a combination of multiple computer systems as described by FIG. 7.

In one implementation, computer system 700 includes processing resources 710, main memory 720, ROM 730, storage device 740, and communication interface 750. Computer system 700 includes at least one processor 710 for processing information. Computer system 700 also includes a main memory 720, such as a random access memory (RAM) or other dynamic storage device, for storing information and instructions to be executed by the processor 710. Main memory 720 also may be used for storing temporary variables or other intermediate information during execution of instructions to be executed by processor 710. Computer system 700 may also include a read only memory (ROM) 730 or other static storage device for storing static information and instructions for processor 710. A storage device 740, such as a magnetic disk or optical disk, is provided for storing information and instructions.

The communication interface 750 can enable the computer system 700 to communicate with one or more networks 780 (e.g., cellular network) through use of the network link (wireless or wireline). Using the network link, the computer system 700 can communicate with one or more computing devices and/or one or more servers. For example, the computer system 700 can (i) receive asset information 756 from one or more asset listing sources, (ii) provide reports 754 to one or more users or subscribers, and/or (iii) provide a matrix interface 752 for display during an auction via the network link. The received asset information 756 can also be processed by the processor 710 and can be stored in, for example, the storage device 740.

Computer system 700 can also include a display device 760, such as a cathode ray tube (CRT), an LCD monitor, or a television set, for example, for displaying graphics and information to a user. In some examples, computer system 700 can display the matrix interface 752 on the display device 760 (e.g., the display device 760 can be provided at a location of the auction). An input mechanism 770, such as a keyboard that includes alphanumeric keys and other keys, can be coupled to computer system 700 for communicating information and command selections to processor 710. Other non-limiting, illustrative examples of input mechanisms 770 include a mouse, a trackball, touch-sensitive screen, or cursor direction keys for communicating direction information and command selections to processor 710 and for controlling cursor movement on display 760.

Examples described herein are related to the use of computer system 700 for implementing the techniques described herein. According to one example, those techniques are performed by computer system 700 in response to processor 710 executing one or more sequences of one or more instructions contained in main memory 720. Such instructions may be read into main memory 720 from another machine-readable medium, such as storage device 740. Execution of the sequences of instructions contained in main memory 720 causes processor 710 to perform the process steps described herein. In alternative implementations, hard-wired circuitry may be used in place of or in combination with software instructions to implement examples described herein. Thus, the examples described are not limited to any specific combination of hardware circuitry and software.

It is contemplated for examples described herein to extend to individual elements and concepts described herein, independently of other concepts, ideas or system, as well as for examples to include combinations of elements recited anywhere in this application. Although examples are described in detail herein with reference to the accompanying drawings, it is to be understood that the examples are not limited to those precise descriptions and illustrations. As such, many modifications and variations will be apparent to practitioners. Accordingly, it is contemplated that a particular feature described either individually or as part of an example can be combined with other individually described features, or parts of other examples, even if the other features and examples make no mentioned of the particular feature.

What is claimed is:

1. A computer system comprising:

a memory to store a set of instructions;

one or more processors that execute the set of instructions, to perform operations that include:

determining a geographic region of interest of a user;

determining a plurality of assets that are located within the geographic region and scheduled for a live auction, each asset of the plurality of assets being associated with corresponding asset information, the corresponding asset information indicating each of an auction status and a bid;

generating an interactive electronic report of assets for the live auction, the electronic report including the corresponding asset information of each asset of the plurality of assets;

based on user interaction with the interactive electronic report, identifying a first asset of interest for the user;

providing, for a displayed interface of a computing device of the user, the corresponding asset information associated with each asset of the plurality of assets, including the first asset; and periodically communicating with an asset database, to dynamically update to displayed interface of the computing device of the user with the corresponding asset information of one or more of the plurality of assets, including the first asset.

2. The computer system of claim 1, wherein the displayed interface includes a plurality of entries, each entry representing one of the plurality of assets, and wherein each entry includes a visual cue that is based on the corresponding asset information of the represented asset.

3. The computer system of claim 2, wherein the visual cue of an entry represents an auction state of the asset represented by the entry.

4. The computer system of claim 3, wherein the visual cue includes one of a color, texture or shading.

5. The computer system of claim 2, wherein the displayed interface is dynamically updated based on one or more updates to the corresponding asset information of assets represented by entries of the displayed interface.

6. The computer system of claim 5, wherein the displayed interface is a matrix interface that visually distinguishes each of multiple entries, based at least in part on the updated corresponding asset information of the represented asset of each of the multiple entries.

7. The computer system of claim 1, wherein determining the geographic region of interest for the user includes determining a location of the user, the location being different than a location of the live auction.

8. The computer system of claim 7, wherein the user is a participant of the live auction.

9. The computer system of claim 1, wherein periodically communicating to dynamically update the displayed interface is performed during the live auction.

10. The computer system of claim 1, wherein periodically communicating to dynamically update the displayed interface is performed more frequently on a day of or during the live auction, as compared to one or more days before the live auction.

11. The computer system of claim 1, wherein the operations further comprise:

maintaining an asset information database, the asset database including a plurality of records, each record including the corresponding asset information for an asset that is scheduled to be auctioned at the live auction; and wherein generating the interactive electronic report is based on the corresponding asset information of a select set of records of the asset information database.

12. The computer system of claim 11, wherein the operations further comprise:

communicating, over one or more networks, with one or more listing sources, to determine and update the asset information associated with each asset that is scheduled to be auctioned.

13. A computer-implemented method, performed by one or more processors, the method comprising:

determining a geographic region of interest of a user;

determining a plurality of assets that are located within the geographic region and scheduled for a live auction, each asset of the plurality of assets being associated with corresponding asset information, the corresponding asset information indicating each of an auction status and a bid;

generating an interactive electronic report of assets for the live auction, the electronic report including the corresponding asset information of each asset of the plurality of assets;

based on user interaction with the interactive electronic report, identifying a first asset of interest for the user;

providing, for a displayed interface of a computing device of the user, the corresponding asset information associated with each asset of the plurality of assets, including the first asset; and periodically communicating with an asset database, to dynamically update the displayed interface of the computing device of the user with the corresponding asset information of one or more of the plurality of assets, including the first asset.

14. The computer-implemented method of claim 13, wherein the displayed interface includes a plurality of entries, each entry representing one of the plurality of assets, and wherein the method includes providing each entry with a visual cue that is based on the corresponding asset information of the represented asset.

15. The computer-implemented method of claim 14, wherein the visual cue of an entry represents an auction state of the asset represented by the entry.

16. The computer-implemented method of claim 15, wherein the visual cue includes one of a color, texture or shading.

17. The computer-implemented method of claim 13, wherein the displayed interface is a matrix interface that visually distinguishes each of multiple entries, based at least in part on the updated corresponding asset information of the represented asset of each of the multiple entries; and wherein the method includes dynamically updating the matrix interface based on one or more updates to the corresponding asset information of assets represented by entries of the matrix interface.

18. The computer-implemented method of claim 13, wherein determining the geographic region of interest for the user includes determining a location of the user, the location being different than a location of the live auction, wherein the user is a participant of the live auction, and wherein the step of periodically updating is performed during the live auction.

19. The computer-implemented method of claim 13, further comprising:

maintaining an asset information database, the asset information database including a plurality of records, each record including the corresponding asset for an asset that is scheduled to be auctioned at the live auction; and wherein generating the interactive electronic report is based on the corresponding asset information of a select set of records of the asset information database.

20. The computer-implemented method of claim 19, further comprising:

communicating, over one or more networks, with one or more listing sources, to determine and update the asset information associated with each asset that is scheduled to be auctioned.

* * * * *